(12) United States Patent
Oizumi (10) Patent No.: US 7,123,748 B2
(45) Date of Patent: Oct. 17, 2006

(54) IMAGE SYNTHESIZING DEVICE AND METHOD

(75) Inventor: Ken Oizumi, Shibuya-ku (JP)

(73) Assignee: Nissan Motor Co., Ltd., Yokohama (JP)

( * ) Notice: Subject to any disclaimer, the term of this patent is extended or adjusted under 35 U.S.C. 154(b) by 781 days.

(21) Appl. No.: 10/231,154

(22) Filed: Aug. 30, 2002

(65) Prior Publication Data

US 2003/0063774 A1    Apr. 3, 2003

(30) Foreign Application Priority Data

Oct. 1, 2001    (JP)    ............................. 2001-304830

(51) Int. Cl.
*G06K 9/00*    (2006.01)

(52) U.S. Cl. ........................ 382/104; 382/284; 345/629

(58) Field of Classification Search ................ 382/104, 382/154, 284, 294; 345/435, 629–641

See application file for complete search history.

(56) References Cited

U.S. PATENT DOCUMENTS

| | | | |
|---|---|---|---|
| 6,404,902 B1 * | 6/2002 | Takano et al. ............... | 382/104 |
| 6,734,896 B1 * | 5/2004 | Nobori et al. ............... | 348/148 |
| 6,744,441 B1 * | 6/2004 | Wu et al. .................... | 345/582 |
| 6,750,873 B1 * | 6/2004 | Bernardini et al. ......... | 345/582 |
| 2002/0034316 A1 * | 3/2002 | Ishii et al. ................... | 382/104 |
| 2003/0021490 A1 * | 1/2003 | Okamoto et al. ........... | 382/284 |

FOREIGN PATENT DOCUMENTS

JP    11-85984 A    3/1999
JP    11-55682 A    9/1999

* cited by examiner

*Primary Examiner*—Bhavesh M. Mehta
*Assistant Examiner*—Craig W. Kronenthal
(74) *Attorney, Agent, or Firm*—Global IP Counselors, LLP (57) ABSTRACT

An image synthesizing device is operatively coupled to a plurality of cameras to accurately express the color and brightness of a synthesized image photographed. The image synthesizing device is configured to synthesize the images of the cameras by selecting with respect to an observation point on a surface being photographed the camera positioned closest to the observation point, designating the color and brightness values of the observation point photographed by that camera as the color and brightness values of the observation point, and conducting the same processing for the entire surface being photographed. Thus, among the cameras, the image synthesizing device selects the camera that is closest to the observation point and uses the color and brightness values of that camera. This arrangement results in selecting a camera that photographs a small area of the photographed surface per unit pixel. Consequently, a synthesized image having good color and brightness precision is obtained.

9 Claims, 6 Drawing Sheets

IMAGE SYNTHESIZING DEVICE AND METHOD

BACKGROUND OF THE INVENTION

1. Field of the Invention

The present invention generally relates to a technology for synthesizing a plurality of images photographed by a plurality of cameras. More specifically, the present invention relates to a device that uses an image of the area surrounding a vehicle to detect the approach of other vehicles and the like.

2. Background Information

When photographing with a plurality of electronic cameras (e.g., CCD cameras), the color and brightness of the images of the same region will not necessarily match because of individual differences in the cameras and the positions of the cameras. Therefore, when the images picked up by a plurality of cameras are synthesized into a single image, the synthesized portions (seams) require special processing. Japanese Laid-Open Patent Publication No. 11-55682 describes a technology for making the differences in lightness and darkness of the synthesized portions inconspicuous. With this technology, the synthesized portions are made inconspicuous by using the average values of the color and brightness obtained by both cameras or using the color and brightness obtained by one of the cameras as the color and brightness at the portion where the images of the two cameras overlap.

In view of the above technology, there exists a need for an improved image synthesizing device. This invention addresses this need in the art as well as other needs, which will become apparent to those skilled in the art from this disclosure.

SUMMARY OF THE INVENTION

It has been discovered that one problem with the previously described technology is that it does not take into consideration the direction and position of the cameras. Rather, the previously described technology simply uses the average values of the color and brightness values obtained by both cameras, or the color and brightness values obtained by one of the cameras. Consequently, the color and brightness of the image at the synthesized portion are not always expressed accurately.

One object of the present invention is to solve this problem of the prior art by providing an image synthesizing device and/or image synthesizing method that can accurately express the color and brightness of a synthesized image obtained using a plurality of cameras.

In order to achieve the aforementioned object, when a region is photographed with the plurality of cameras, the color and brightness of the synthesized image is expressed accurately by using the image of the camera that is determined to be photographing the color and brightness the most accurately.

The foregoing object is basically attained by providing an image synthesizing device that comprises at least first and second cameras or devices for capturing and generating at least first and second images, respectively, and an image processing device for processing the at least first and second images from the at least first and second cameras or devices. The image processing device is further configured to synthesizes the at least first and second images by determining a plurality of observation points for a reference surface being captured by the at least first and second cameras or devices, determining color and brightness values for at least one of the at least first and second cameras or devices for each of the observation points, and using the color and brightness values of at least one of the at least first and second cameras or devices to designate color and brightness values for the observation points, the color and brightness values for the observation points being based on positions of the at least first and second means to relative the observation points.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to/those skilled in the art from this disclosure that the following descriptions of the embodiments of the present invention are provided for illustration only and not for the purpose of limiting the invention as defined by the appended claims and their equivalents.

Figure 1:
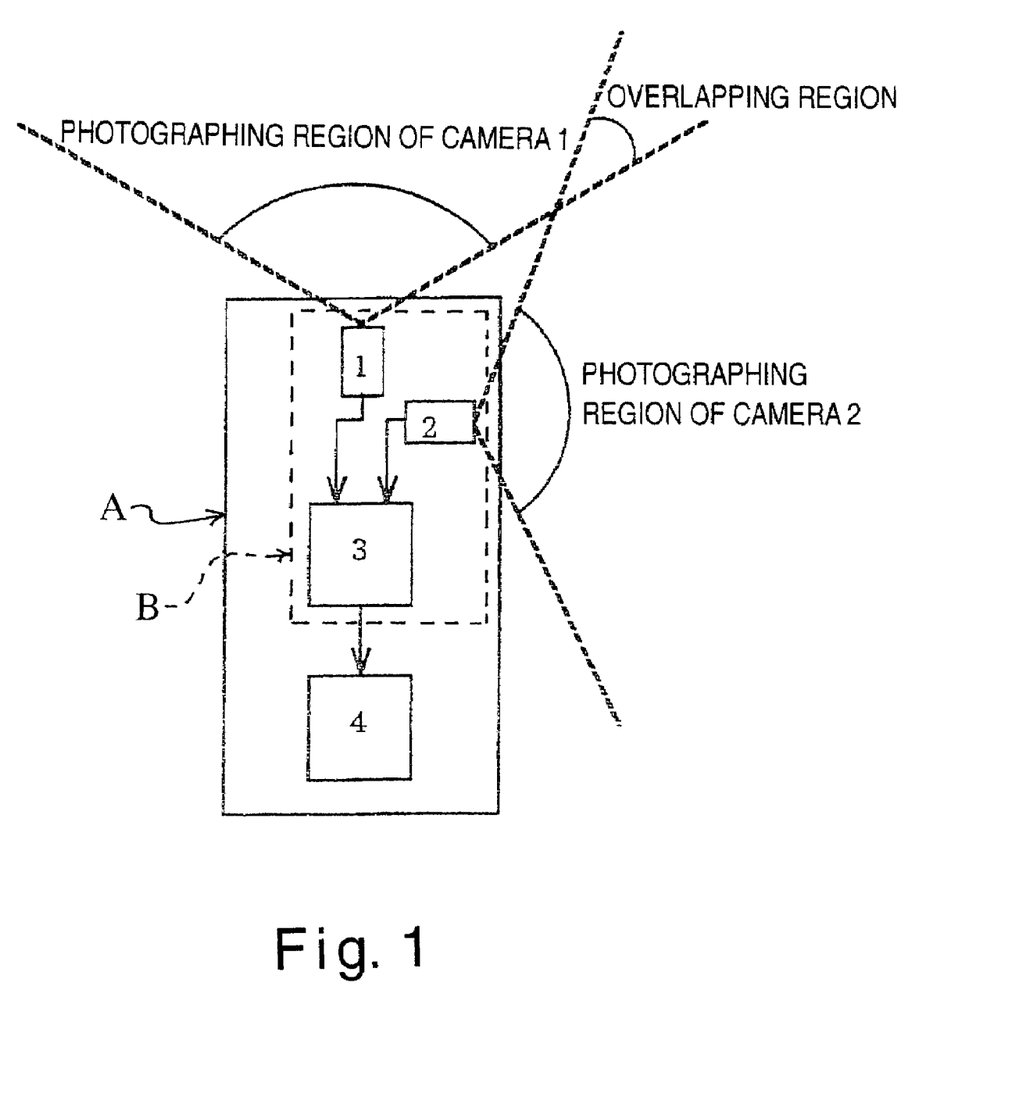
FIG. 1 is a block diagram of a vehicle equipped with a proximity alarm device and an image synthesizing device (a pair of cameras, an image processing device) in accordance with the present invention to diagrammatically illustrate the present invention being used in conjunction with the proximity alarm device of the vehicle.

Referring initially to FIG. 1, a block diagram of a vehicle A equipped with an image synthesizing device B is illustrated in accordance with the present invention. The image synthesizing device B of the present invention relates to a technology for performing skillful image processing in the areas where the images overlap when the images of multiple cameras are synthesized.

The image synthesizing device B basically includes a first camera 1, a second camera 2 and an image processing device 3. The first camera 1 is arranged on the vehicle A to take photographs in front of the vehicle A, while the second camera 2 is arranged on the vehicle A to take photographs to the right side of the vehicle A. It will be apparent to those skilled in the art from this disclosure that the cameras 1 and 2 can be CCD cameras or other electronic cameras. It will be apparent to those skilled in the art from this disclosure that additional cameras can be used as needed and/or desired.

The image processing device 3 is operatively coupled to the cameras 1 and 2 to electrically receive the photographed images therefrom. In other words, the image processing device 3 receives image signals from the cameras 1 and 2, and then synthesizes the image signals into a single image that encompasses a wide range from the front side of the vehicle A to the right side of the vehicle A, i.e., an image that includes vehicles traveling in front of the vehicle A and other vehicles traveling in the passing lane to the right of the vehicle A.

The image processing device 3 preferably includes a microcomputer with a synthesizing program that synthesizes the images from the cameras 1 and 2 as discussed below. The image processing device 3 can also include other conventional components such as an input interface circuit, an output interface circuit, and storage devices such as a ROM (Read Only Memory) device and a RAM (Random Access Memory) device. The memory circuit stores processing results and control programs such as ones for synthesizing the images of the cameras 1 and 2. The image processing device 3 is operatively coupled to the cameras 1 and 2 and the proximity alarm device 4 in a conventional manner.

The image processing device 3 of FIG. 1 is operatively coupled to a proximity alarm device 4 of the vehicle A. The proximity alarm device 4 is conventional device that is well known in the art. Since proximity alarm devices are well known in the art, the precise structure of the proximity alarm device 4 will not be discussed or illustrated in detail herein.

Based on the synthesized image, the proximity alarm device 4 detects the vehicles that could possibly approach the vehicle A. In other words, the proximity alarm device 4 detects other vehicles traveling in front of the vehicle A as well as other vehicles traveling in the passing lane to the right of the vehicle A. When there is a risk that such other vehicles will approach excessively close to the vehicle A, the proximity alarm device 4 emits an alarm to urge caution on the part of the driver of the vehicle A.

It will be apparent to those skilled in the art from this disclosure that the present invention concerns an image synthesizing technology and is not limited to use with the proximity alarm device 4 as shown in FIG. 1. In other words, the present invention can be used in a wide variety of applications. For example, regarding vehicle applications, it is acceptable to provide cameras that photograph above and below the vehicle in addition to cameras that photograph to the left and right of the vehicle A as shown in FIG. 1. The present invention can also be used in general-purpose applications other than vehicle applications. For example, it could be used in an application that synthesizes the images of four cameras that are installed on the roof of a building and photographing the eastward, westward, southward, and northward directions.

Figure 2:
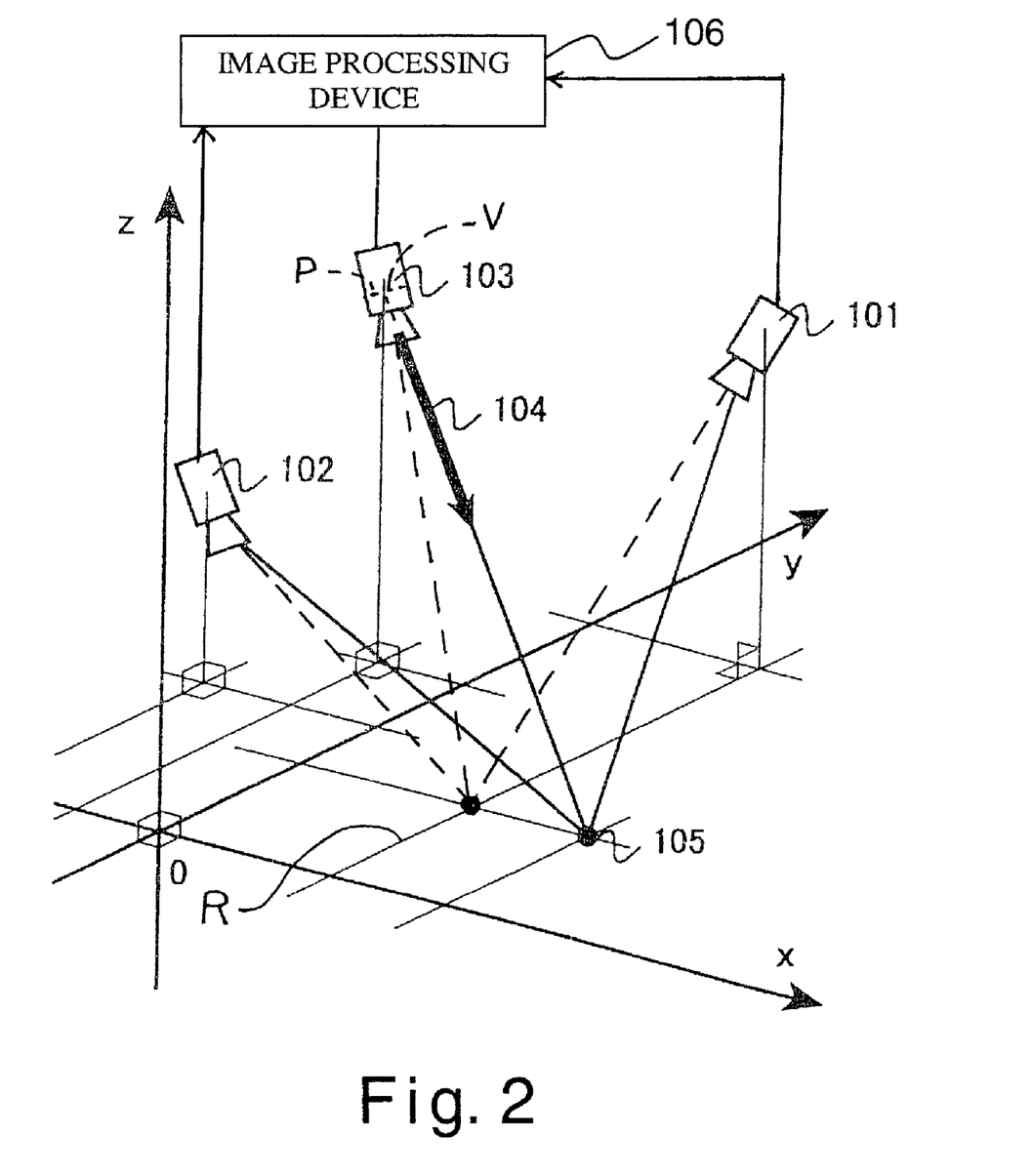
FIG. 2 shows an arrangement of three cameras in xyz coordinate space to diagrammatically illustrate the intersection point of the cameras used in the synthesizing device and/or method of the present invention.
Figure 3:
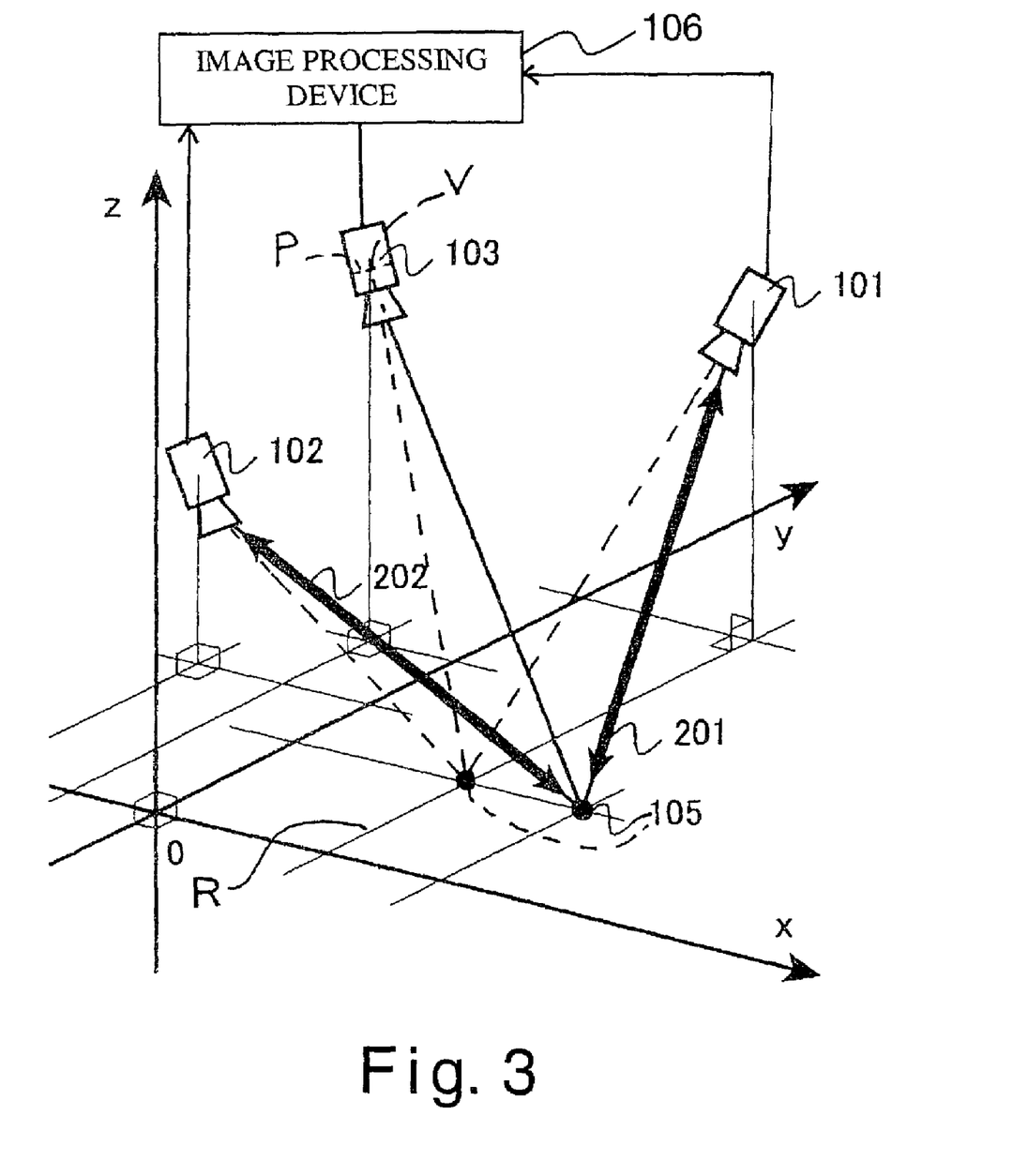
FIG. 3 shows an arrangement of three cameras in xyz coordinate space to diagrammatically illustrate the distance between each camera and their intersection point of the synthesizing device and/or method of the present invention that uses.
Figure 4:
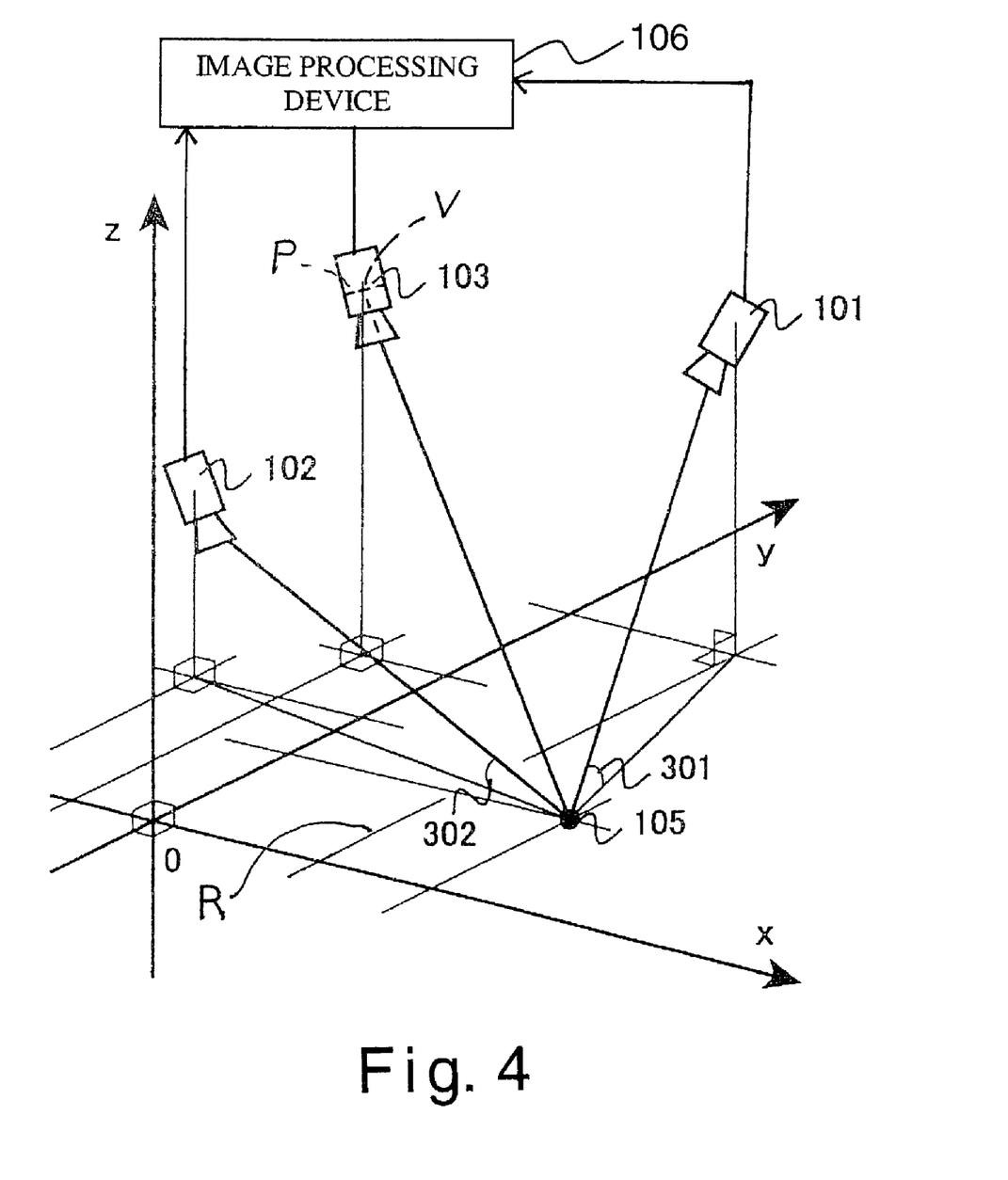
FIG. 4 shows an arrangement of three cameras in xyz coordinate space to diagrammatically illustrate the angle between the reference surface and the straight line joining each camera and their intersection point of the synthesizing device and/or method of the present invention.

Referring now to FIGS. 2–4, these schematic diagrams of the image synthesizing device B are illustrated to explain five embodiments of the present invention. The image synthesizing device B of each embodiment creates a synthesized image obtained by synthesizing the images of the plurality of real cameras as the image of a virtual camera through computer processing.

In FIGS. 2–4, the image synthesizing device B of each of the five embodiments of the present invention includes a first real camera 101 (e.g., digital cameras using CCD or the like), a second real camera 102 (e.g., digital cameras using CCD or the like) and a virtual camera 103 that is created virtually by an image processing device 106, which uses computer processing to create a synthesized image. Thus, FIGS. 2–4 show the cameras 101 and 102 and 103 of the synthesizing methods in accordance with the present invention arranged in an xyz coordinate space.

For the sake of simplicity, the explanation presented here will use a typical pinhole camera as the model for the cameras 101, 102 and 103. The reference point indicating the position of the camera will be the position of the pinhole. The pinhole is located on a straight line that extends perpendicularly from the center of the projection surface of the pinhole camera and the direction of the camera is defined to be the same as that of a vector from the center of the projection surface to the pinhole. The real cameras 101 and 102 and the virtual camera 103 are all explained using this pinhole camera model. However, it is also acceptable to use a more complex camera model that more accurately models a real camera.

First Embodiment

First, the position and orientation of the real cameras 101 and 102 are set up in the apparatus or device, e.g., the vehicle A, to photograph the desired area. The position and orientation of the virtual camera 103 are preferably established to produce the desired synthesized image for that particular application. In other words, the position and orientation of the virtual camera 103 preferably selected to produce the most accurate synthesized image for that particular application.

Assume the virtual camera 103 is installed in the position indicated in the FIGS. 2–4. The virtual camera 103 has an image projection surface P with a predetermined array of pixels that form the synthesized image. Now, focusing on an arbitrary pixel V of the virtual camera 103, it is possible to calculate the direction of a light ray incident on the pixel V based on the position of the pixel V on the projection surface P and the direction of the virtual camera 103. In other words, the position and direction of the virtual camera 103 can be used to calculate the position and direction in the xyz space of the light ray incident on the pixel V. The position and direction of the light ray incident on the pixel V are indicated with a vector 104 (bold arrow). With the pinhole camera model used in this embodiment, the starting point of the vector 104 is the position of the virtual camera 103. Of course, the light rays incident on each of the pixels on the projection surface P are preferably determined in this manner.

Next, at least one reference surface R is established for the area being photographed. The position of the reference surface R is preferably established based on the desired synthesized image to be obtained for that particular application. In other words, the reference surface R includes a surface being photographed by the real cameras 101 and 102. The reference surface R includes a plurality of observation points 105 that preferably corresponds to the predetermined array of pixels of the image projection surface P that form the synthesized image of the area being photographed. In this embodiment, an entire x-y plane is established as the reference surface R. Alternatively, it is also acceptable to use a combination of a plurality planes having limited and/or limitless surface areas as the reference surface R.

Next, in the illustrated embodiment, one of the observation points 105 is found. The observation point 105 is the intersection point between the reference surface R and the light ray obtained by extending the vector 104 to the point where it intersects with the reference surface R. When several reference surfaces are used, the reference surface that is first intersected by the light ray of the vector 104 is used. Thus, the observation point 105 illustrated in FIGS. 2–4, corresponds to the pixel V on the projection surface P of the virtual camera 103.

As a result of this arrangement, the color value and the brightness value of the pixel V cannot be calculated by the image processing device 106 when the light ray obtained by extending the vector 104 to the point where it intersects with the reference surface R does not intersect the reference surface R. In such a case, predetermined values are assigned as the color and brightness values of the pixel V of the virtual camera 103 (e.g., color=black and brightness=0).

Similarly to the case of the virtual camera 103, discussed above, the position and direction of the cameras 101 and 102 can also be used to calculate the position and direction of light rays in xyz space for the cameras 101 and 102. In other words, the position and direction of light rays extending from each pixel of the cameras 101 and 102 can be determined for each of the observation points 105 of the reference surface R that are intersected by such light rays from the cameras 101 and 102.

If the observation point 105 exists for a pixel of the virtual camera 103, i.e., the extended light ray of the vector 104 intersects with the reference surface R, then the image processing device 106 determines whether or not the observation point 105 lies within the photographing regions of one or both of the cameras 101 and 102.

The color and brightness values of the pixel V cannot be calculated when the observation point 105 is located outside the photographing region of both cameras 101 and 102. In such a case, predetermined values are assigned as the color and brightness values of the pixel V of the virtual camera 103 (e.g., color=black and brightness=0).

When the observation point 105 is within the photographing region of only one of the cameras 101 or 102, the image processing device 106 determines or calculates which pixel of that camera contains the portion of the image that corresponds to the observation point 105 and sets the color and brightness values of the calculated pixel of the cameras 101 or 102 as the color and brightness values of the pixel V for the virtual camera 103.

When the observation point 105 is within the photographing region of a plurality of cameras, i.e., both of the cameras 101 or 102 in the illustrated example, the image processing device 106 first eliminates from the calculation those cameras that are not photographing the observation point 105. Then, as shown in FIG. 3, a distance Ln (distance 201 in the case of the camera 101 and a distance 202 in the case of camera 102) between the camera n and the observation point 105 is found for each of the cameras and the camera for with the smallest value of Ln is selected as the basis camera for that observation point. Of course, the cameras for which the distance is 0 are eliminated from the calculation. As explained previously, an image having good color and brightness precision is obtained because the camera having the smallest distance Ln is used, i.e., the camera that is closest to the observation point 105, which photographs the smallest area of the photographed surface per unit pixel.

If there are several cameras for which distance Ln is the same, the image processing device 106 determines which of the cameras is installed in the highest position and then selects that camera. If both the distance Ln and the height are the same, the conditions are equivalent and the image processing device 106 simply selects the camera whose preassigned camera number is smallest for purpose of processing convenience.

Next, the image processing device 106 calculates the color and brightness values of the pixel of the selected or basis camera 101 or 102 that contains the image of the observation point 105 and sets the color and brightness values of the pixel V for the virtual camera 103 equal to the calculated pixel as the color and brightness values of the selected or basis camera 101 or 102 that corresponds to the image of the observation point 105.

While the image synthesizing device B of FIGS. 2 and 3 illustrate an example in which there are two real cameras, it will be apparent to those skilled in the art from this disclosure that the processing can be conducted according to the same method described above when there are three or more cameras.

The image processing device 106 creates the entire image of the virtual camera 103 by conducting the processing just described for all of the pixels of the virtual camera 103. Thus, the respective images photographed by the camera 101 and the camera 102 can be produced as a synthesized image on the screen of the virtual camera 103.

The correspondence relationship between pixels of the virtual camera 103 will not change so long as the positions of the cameras 101 and 102 and the virtual camera 103 and the reference surface R do not change. Consequently, it is also acceptable to construct the image synthesizing device B such that once the calculations have been conducted to determine which pixels from the cameras 101 and 102 will be used for the color and brightness values of the pixels for the virtual camera 103, these results are stored in a table and, thereafter, the image synthesizing device B refers to the table, thereby reducing the volume of the calculations.

Also, when the present invention is worked as described here, the processing can be accomplished easily by using a computer as image processing device 106 and preparing software that executes the previously described image processing. Thus, the image processing device 106 preferably includes a microcomputer with a synthesizing program that synthesizes the images from the cameras 101 and 102 as discussed below. The image processing device 106 can also include other conventional components such as an input interface circuit, an output interface circuit, and storage devices such as a ROM (Read Only Memory) device and a RAM (Random Access Memory) device. The memory circuit stores processing results and control programs such as ones for synthesizing the images of the cameras 101 and 102. The image processing device 106 is operatively coupled to the cameras 101 and 102. It will be apparent to those skilled in the art from this disclosure that the precise structure and algorithms for image processing device 106 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

As previously described, an image having good color and brightness precision is obtained because the camera for which distance Ln is smallest, i.e., the camera that is closest to the observation point (observation point 105), photographs the smallest area of the photographed surface per unit pixel. Consequently, a synthesized image having good color and brightness precision is obtained.

Second Embodiment

The second embodiment is the same as the first embodiment regarding the arrangement of the real cameras 101 and 102 and the virtual camera 103, the vector 104, the reference surface R, and the observation point 105. However, determination of the color and brightness values of the pixels of the virtual camera 103 based on the arrangement of the real cameras 101 and 102 is different in this second embodiment. More specifically, the second embodiment differs from the first embodiment regarding the processing that is executed when the observation point 105 is contained in the photographing region of a plurality of cameras, but otherwise the two embodiments are the same.

As in the first embodiment, the color and brightness values of the pixels of the virtual camera 103 is based on the arrangement (positions) of the real cameras 101 and 102 relative to the reference surface R. Thus, the color and brightness values of the pixels of the virtual camera 103 is calculated based on the color and brightness values of the pixels of the real cameras 101 and 102 for each of the observation points 105.

Like in the first embodiment, the observation point 105 is the intersection point between the reference surface R and the light ray obtained by extending the vector 104 to the point where it intersects with the reference surface R. The color and brightness values of the pixel V cannot be calculated by the image processing device 106 in the second embodiment when the light ray obtained by extending the vector 104 to the point where it intersects with the reference surface R does not intersect the reference surface R. In such a case, predetermined values are assigned as the color and brightness values of the pixel V of the virtual camera 103 (e.g., color=black and brightness=0).

If the observation point 105 exists for a pixel of the virtual camera 103, i.e., the extended light ray of the vector 104 intersects with the reference surface R, then the image processing device 106 determines whether or not the observation point 105 lies within the photographing regions of one or both of the cameras 101 and 102. Similarly to the case of the virtual camera 103, the positions and directions of the cameras 101 and 102 can also be used to calculate the position and direction of a light ray in xyz space in the cases of the camera 101 and the camera 102.

Like in the first embodiment, the color and brightness values of the pixel V of the virtual camera 103 cannot be calculated when the observation point 105 is located outside the photographing region of both cameras 101 and 102. In such a case, predetermined values are assigned as the color and brightness values of the pixel V of the virtual camera 103 (e.g., color=black and brightness=0).

When the observation point 105 is within the photographing region of only one of the cameras 101 or 102, the image processing device 106 determines or calculates which pixel of that camera contains the portion of the image that corresponds to the observation point 105 and sets the color and brightness values of the calculated pixel of the cameras 101 or 102 as the color and brightness values of the pixel V for the virtual camera 103.

When the observation point 105 is within the photographing region of a plurality of cameras, i.e., both of the cameras 101 or 102 in the illustrated example, the image processing device 106 first eliminates from the calculation those cameras that are not photographing the observation point 105. Then, as shown in FIG. 3, a distance Ln (distance 201 in the case of the camera 101 and a distance 202 in the case of camera 102) between the camera n and the observation point 105 is found for each of the cameras and the camera for with the smallest value of Ln is selected. Of course, the cameras for which the distance is 0 are eliminated from the calculation.

Next, function f(Ln) based on distance Ln is used to calculate the strength Sn of the pixels of each of the cameras 101 and 102. Since the region photographed by each pixel increases proportionally to the square of the distance between the camera and the photographed object, the closer cameras are determined to be picking up the color and brightness of a narrower region. Consequently, the function f(Ln) can be expressed, for example, as follows:

$$f(Ln)=1/Ln^2 \qquad \text{(Equation 1)}$$

For example, when Equation 1 is used, if the ratio of the distance 201 to the distance 202 were 2:1, then the color application ratio would be 0.25:1.

Next, the image processing device 106 determines which pixel of each of the cameras 101 and 102 contains the image of the observation point 105. Then, the image processing device 106 calculates the color and brightness values of the pixel of each of the cameras 101 and 102 that corresponds to the image of the observation point 105. These calculated pixels of the cameras 101 and 102 are blended proportionally based on their strengths Sn. Then, the image processing device 106 set the color and brightness values of the pixel V for the virtual camera 103 equal to the blended color and brightness values of the calculated pixels of the cameras 101 and 102 that corresponds to the image of the observation point 105. Various methods are known in the computer graphics field for blending colors of differing application ratios. While the image synthesizing device B of FIGS. 2 and 3 illustrate an example in which there are two real cameras, it will be apparent to those skilled in the art from this disclosure that the above processing of this second embodiment can be used when there are three or more cameras.

The image processing device 106 creates the entire image of the virtual camera 103 by conducting the processing just described for all of the pixels of the virtual camera 103. Thus, the respective images photographed by the camera 101 and the camera 102 can be produced as a synthesized image on the screen of the virtual camera 103. Similarly to the first embodiment, it is also acceptable to construct the image synthesizing device B such that the calculations are conducted only once and the results are stored in a table. Thereafter, the image synthesizing device B refers to the table to reducing the volume of the calculations.

In the second embodiment, the images of the cameras 101 and 102 are synthesized using a strength S(n) calculated using a function f(Ln) that is based on the distance Ln between the observation point and the camera. Consequently, a good image having color and brightness that are close to those of the actual object are obtained while preventing the seams of the image from standing out.

Third Embodiment

The third embodiment is the same as the first and second embodiments regarding the arrangement of the real cameras 101 and 102 and the virtual camera 103, the vector 104, the reference surface R, and the observation point 105. However, determination of the color and brightness values of the pixels of the virtual camera 103 based on the arrangement of the real cameras 101 and 102 is different in this third embodiment. More specifically, the third embodiment differs from the first embodiment and the second embodiment regarding the processing that is executed when the observation point 105 is contained in the photographing region of a plurality of cameras, but otherwise the embodiments are the same.

As in the first embodiment, the color and brightness values of the pixels of the virtual camera 103 is based on the arrangement (positions) of the real cameras 101 and 102 relative to the reference surface R. Thus, the color and brightness values of the pixels of the virtual camera 103 is calculated based on the color and brightness values of the pixels of the real cameras 101 and 102 for each of the observation points 105.

Like in the first embodiment, the color and brightness values of the pixel V cannot be calculated by the image processing device 106 in the third embodiment when the light ray obtained by extending the vector 104 to the point where it intersects with the reference surface R does not intersect the reference surface R. In such a case, predetermined values are assigned as the color and brightness values of the pixel V (e.g., color=black and brightness=0).

Next, if the observation point 105 exists for a pixel of the virtual camera 103, i.e., the extended light ray of the vector 104 intersects with the reference surface R, then the image processing device 106 determines whether or not the observation point 105 lies within the photographing regions of one or both of the cameras 101 and 102. Similarly to the case of the virtual camera 103, the positions and directions of the cameras 101 and 102 can also be used to calculate the position and direction of a light ray in xyz space in the cases of the camera 101 and the camera 102.

The color and brightness values of the pixel V cannot be calculated when the observation point 105 is outside the photographing region of both cameras 101 and 102. In such a case, predetermined values are assigned as the color and brightness values of the pixel V of the virtual camera 103 (e.g., color=black and brightness=0).

When the observation point 105 is within the photographing region of only one of the cameras 101 or 102, the image processing device 106 determines or calculates which pixel of that camera contains the portion of the image that corresponds to the observation point 105 and sets the color and brightness values of the calculated pixel of the cameras 101 or 102 as the color and brightness values of the pixel V for the virtual camera 103.

When the observation point 105 is within the photographing region of a plurality of cameras, i.e., both of the cameras 101 or 102 in the illustrated example, the image processing device 106 first eliminates from the calculation those cameras that are not photographing the observation point 105. Then, as shown in FIG. 4, the angle αn (angle 301 in the case of camera 101 and angle 302 in the case of the camera 102) between the reference surface R and a line segment joining camera "n" and the observation point 105 is found for each camera and the camera for which angle αn is closest to 90 degrees is selected as the basis camera for that observation point. As previously described, an image having good color and brightness precision is obtained because the camera for which angle αn is closest to 90 degrees, i.e., the camera that photographs from the angle closest to being perpendicular to the photographed surface, photographs the smallest area of the photographed surface per unit pixel and experience little influence of shadows.

If there is a plurality of cameras for which angle αn is the same, the camera n with the shortest distance Ln from the observation point 105 is selected as in the first embodiment. If both the angle αn and the distance Ln are the same for several cameras, the conditions are equivalent and the image processing device 106 simply selects the camera whose assigned camera number is smallest for purpose of processing convenience.

Next, the image processing device 106 calculates the color and brightness values of the pixel of the selected or basis camera 101 or 102 that contains the image of the observation point 105 and sets the color and brightness values of the pixel V for the virtual camera 103 equal to the calculated pixel as the color and brightness values of the selected or basis camera 101 or 102 that corresponds to the image of the observation point 105.

The image synthesizing device B creates the entire image of the virtual camera 103 by conducting the processing just described for all of the pixels of the virtual camera 103. Thus, the respective images photographed by the camera 101 and the camera 102 can be produced as a synthesized image on the screen of the virtual camera 103. The calculations can be conducted using the same method when there are three or more cameras. Similarly to the first embodiment, it is also acceptable to construct the image synthesizing device B such that the calculations are conducted only once and the results are stored in a table. Thereafter, the image synthesizing device B refers to the table to reducing the volume of the calculations.

In the third embodiment, the camera that is close to being perpendicular to the photographed surface (reference surface R) where the observation point exists is selected and the color and brightness values of that camera are used. Consequently, a camera that photographs a small area of the photographed surface per unit pixel is selected, solid objects have few shadows, an image having good color and brightness precision is obtained.

Fourth Embodiment

The fourth embodiment is the same as the first, second and third embodiments regarding the arrangement of the real cameras 101 and 102 and the virtual camera 103, the vector 104, the reference surface R, and the observation point 105. However, determination of the color and brightness values of the pixels of the virtual camera 103 based on the arrangement of the real cameras 101 and 102 is different in this fourth embodiment. More specifically, the fourth embodiment differs from the first through third embodiments regarding the processing that is executed when the observation point 105 is contained in the photographing region of a plurality of cameras, but otherwise the embodiments are the same.

As in the first embodiment, the color and brightness values of the pixels of the virtual camera 103 is based on the arrangement (positions) of the real cameras 101 and 102 relative to the reference surface R. Thus, the color and brightness values of the pixels of the virtual camera 103 is calculated based on the color and brightness values of the pixels of the real cameras 101 and 102 for each of the observation points 105.

Like in the first embodiment, the color and brightness values of the pixel V cannot be calculated by the image processing device 106 in the fourth embodiment when the light ray obtained by extending the vector 104 to the point where it intersects with the reference surface R does not intersect the reference surface R. In such a case, predetermined values are assigned as the color and brightness values of the pixel V of the virtual camera 103 (e.g., color=black and brightness=0).

Next, if the observation point 105 exists for a pixel of the virtual camera 103, i.e., the extended light ray of the vector 104 intersects with the reference surface R, then the image processing device 106 determines whether or not the observation point 105 lies within the photographing regions of one or both of the cameras 101 and 102. Similarly to the case of the virtual camera 103, the positions and directions of the cameras 101 and 102 can also be used to calculate the position and direction of a light ray in xyz space in the cases of the camera 101 and the camera 102.

Like in the first embodiment, the color and brightness values of the pixel V of the virtual camera 103 cannot be calculated when the observation point 105 is located outside the photographing region of both cameras 101 and 102. In such a case, predetermined values are assigned as the color and brightness values of the pixel V of the virtual camera 103 (e.g., color=black and brightness=0).

When the observation point 105 is within the photographing region of only one of the cameras 101 or 102, the image processing device 106 determines or calculates which pixel of that camera contains the portion of the image that corresponds to the observation point 105 and sets the color and brightness values of the calculated pixel of the cameras 101 or 102 as the color and brightness values of the pixel V for the virtual camera 103.

When the observation point 105 is within the photographing region of a plurality of cameras, i.e., both of the cameras 101 or 102 in the illustrated example, the image processing device 106 first eliminates from the calculation those cameras that are not photographing the observation point 105. Then, as shown in FIG. 4, the angle $\alpha n$ between the reference surface R and a line segment joining camera n and the observation point 105 is found for each of the cameras 101 and 102.

Next, function $f(\alpha n)$ based on angle $\alpha n$ (angle 301 in the case of camera 101 and angle 302 in the case of camera 102) is used to calculate the strength Sn of the pixels of each camera. Since the region photographed by each pixel increases as the angle $\alpha n$ (0 to 90 degrees) approaches zero, the cameras for which angle $\alpha n$ is close to 90 degrees are determined to be picking up the color and brightness values of a narrower region. Consequently, the function $f(\alpha n)$ can be expressed, for example, as follows:

$$f(\alpha n) = \sin \alpha n \qquad \text{(Equation 2)}.$$

The details of the function $f(\alpha n)$ will be discussed later.

For example, when Equation 2 is used, if angle 301 is ninety (90) degrees and angle 302 is thirty (30) degrees then the color blending ratio would be 1:0.5.

Next, the image processing device 106 determines which pixel of each of the cameras 101 and 102 contains the image of the observation point 105. Then, the image processing device 106 calculates the color and brightness values of the pixel of each of the cameras 101 and 102 that corresponds to the image of the observation point 105. These calculated pixels of the cameras 101 and 102 are blended proportionally based on their strengths Sn. Then, the image processing device 106 set the color and brightness values of the pixel V for the virtual camera 103 equal to the blended color and brightness values of the calculated pixels of the cameras 101 and 102 that corresponds to the image of the observation point 105. Various methods are known in the computer graphics field for blending colors of differing application ratios.

The image processing device 106 creates the entire image of the virtual camera 103 by conducting the processing just described for all of the pixels of the virtual camera 103. Thus, the respective images photographed by the camera 101 and the camera 102 can be produced as a synthesized image on the screen of the virtual camera 103. The calculations can be conducted in using the same method when there are three or more cameras. Similarly to the first embodiment, it is also acceptable to construct the image synthesizing device B such that the calculations are conducted only once and the results are stored in a table. Thereafter, the image synthesizing device B refers to the table to reducing the volume of the calculations.

In the fourth embodiment, the images are synthesized using a strength S(n) calculated using a function $f(\alpha n)$ that is based on the angle an between the photographed surface and a straight line joining the observation point and the camera. Consequently, a good image having color and brightness that are close to those of the actual object are obtained while preventing the seams of the image from standing out.

Fifth Embodiment

The fifth embodiment is the same as the first through fourth embodiments regarding the arrangement of the real cameras 101 and 102 and the virtual camera 103, the vector 104, the reference surface R, and the observation point 105. However, determination of the color and brightness values of the pixels of the virtual camera 103 based on the arrangement of the real cameras 101 and 102 is different in this fifth embodiment. More specifically, the fifth embodiment differs from the first through fourth embodiments regarding the processing that is executed when the observation point 105 is contained in the photographing region of a plurality of cameras, but otherwise the embodiments are the same.

As in the first embodiment, the color and brightness values of the pixels of the virtual camera 103 is based on the arrangement (positions) of the real cameras 101 and 102 relative to the reference surface R. Thus, the color and brightness values of the pixels of the virtual camera 103 is calculated based on the color and brightness values of the pixels of the real cameras 101 and 102 for each of the observation points 105.

Like in the first embodiment, the color and brightness values of the pixel V cannot be calculated by the image processing device 106 in the fifth embodiment when the light ray obtained by extending the vector 104 to the point where it intersects with the reference surface R does not intersect the reference surface R. In such a case, predetermined values are assigned as the color and brightness values of the pixel V (e.g., color=black and brightness=0).

Next, if the observation point 105 exists for a pixel of the virtual camera 103, i.e., the extended light ray of the vector 104 intersects with the reference surface R, then the image processing device 106 determines whether or not the observation point 105 lies within the photographing regions of one or both of the cameras 101 and 102. Similarly to the case of the virtual camera 103, the positions and directions of the cameras 101 and 102 can also be used to calculate the position and direction of a light ray in xyz space in the cases of the camera 101 and the camera 102.

Like in the first embodiment, the color and brightness values of the pixel V of the virtual camera 103 cannot be calculated when the observation point 105 is located outside the photographing region of both cameras 101 and 102. In such a case, predetermined values are assigned as the color and brightness values of the pixel V of the virtual camera 103 (e.g., color=black and brightness=0).

When the observation point 105 is within the photographing region of only one of the cameras 101 or 102, the image processing device 106 determines or calculates which pixel of that camera contains the portion of the image that corresponds to the observation point 105 and sets the color and brightness values of the calculated pixel of the cameras 101 or 102 as the color and brightness values of the pixel V for the virtual camera 103.

When the observation point 105 is within the photographing region of a plurality of cameras, i.e., both of the cameras 101 or 102 in the illustrated example, the image processing device 106 first eliminates from the calculation those cameras that are not photographing the observation point 105. Then, as shown in FIGS. 3 and 4, the angle an (angle 301 in the case of camera 101 and angle 302 in the case of camera 102) between the reference surface R and a line segment joining camera n and the observation point 105 and the distance Ln (distance 201 in the case of camera 101 and distance 202 in the case of camera 102) between camera n and the observation point 105 are found for each camera. Cameras for which Ln is 0 are eliminated from the calculations.

Next, function f(Ln, αn) based on distance Ln and angle αn is used to calculate the strength Sn of the pixels of each camera. Since the region photographed by each pixel increases proportionally to the square of the distance between the camera and the photographed object, and the region photographed by each pixel also increases as the angle αn (0 to 90 degrees) approaches 0, the cameras for which distance Ln is small and angle αn is close to ninety (90) degrees are determined to be picking up the color and brightness of a narrower region. Consequently, the function f(Ln, αn) can be expressed, for example, as follows:

$$f(Ln, \alpha n)=\sin \alpha n/Ln^2 \quad \text{(Equation 3)}.$$

For example, when Equation 3 is used, if the ratio of the distance 201 to the distance 202 is 3:1, the angle 301 is ninety (90) degrees, and the angle 302 is thirty (30) degrees, then the color blending ratio would be 2:9.

Next, the image processing device 106 determines which pixel of each of the cameras 101 and 102 contains the image of the observation point 105. Then, the image processing device 106 calculates the color and brightness values of the pixel of each of the cameras 101 and 102 that corresponds to the image of the observation point 105. These calculated pixels of the cameras 101 and 102 are blended proportionally based on their strengths Sn. Then, the image processing device 106 set the color and brightness values of the pixel V for the virtual camera 103 equal to the blended color and brightness values of the calculated pixels of the cameras 101 and 102 that corresponds to the image of the observation point 105. Various methods are known in the computer graphics field for blending colors of differing application ratios. The above calculations can be conducted using the same method when there are three or more cameras.

The image processing device 106 creates the entire image of the virtual camera 103 by conducting the processing just described for all of the pixels of the virtual camera 103.

Thus, the respective images photographed by the camera 101 and the camera 102 can be produced as a synthesized image on the screen of the virtual camera 103. Similarly to the first embodiment, it is also acceptable to construct the image synthesizing device B such that the calculations are conducted only once and the results are stored in a table. Thereafter, the image synthesizing device B refers to the table to reducing the volume of the calculations.

In the fifth embodiment, the images are synthesized using a strength S(n) calculated using a function f(Ln, αn) that is based on the distance Ln between the observation point and camera n and the angle αn between the photographed surface and a straight line joining the observation point and the camera. Consequently, a good image having color and brightness values that are close to those of the actual object are obtained while preventing the seams of the image from standing out.

Figure 5:
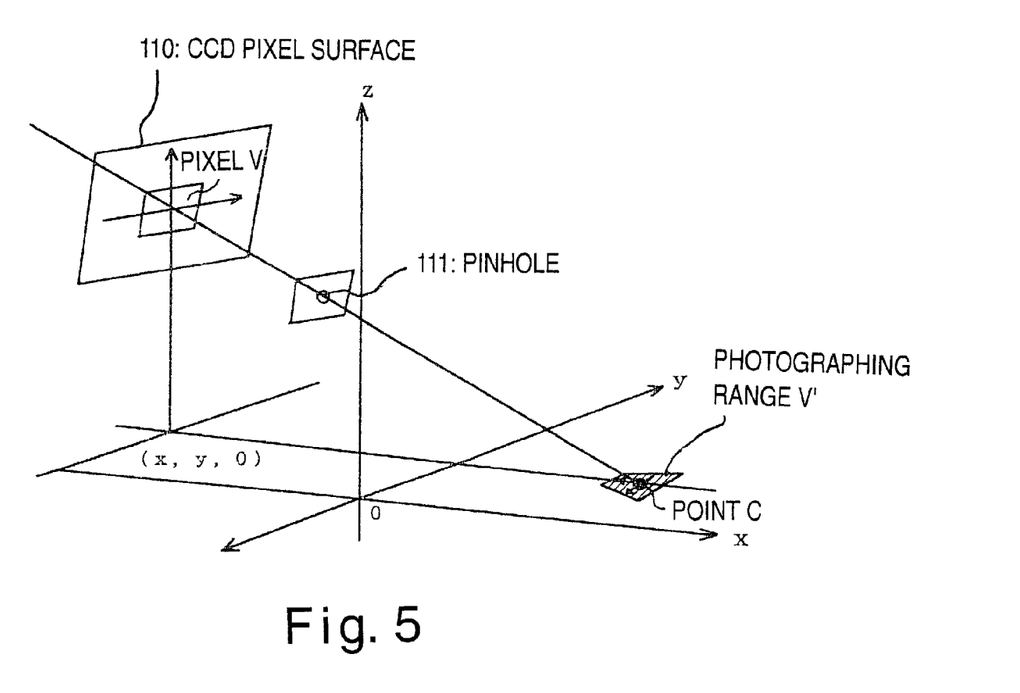
FIG. 5 is a diagrammatic perspective view of a pinhole camera to diagrammatically explain the calculations of color and brightness values for producing a synthesizing image by using the synthesizing device and/or method of the present invention.
Figure 6:
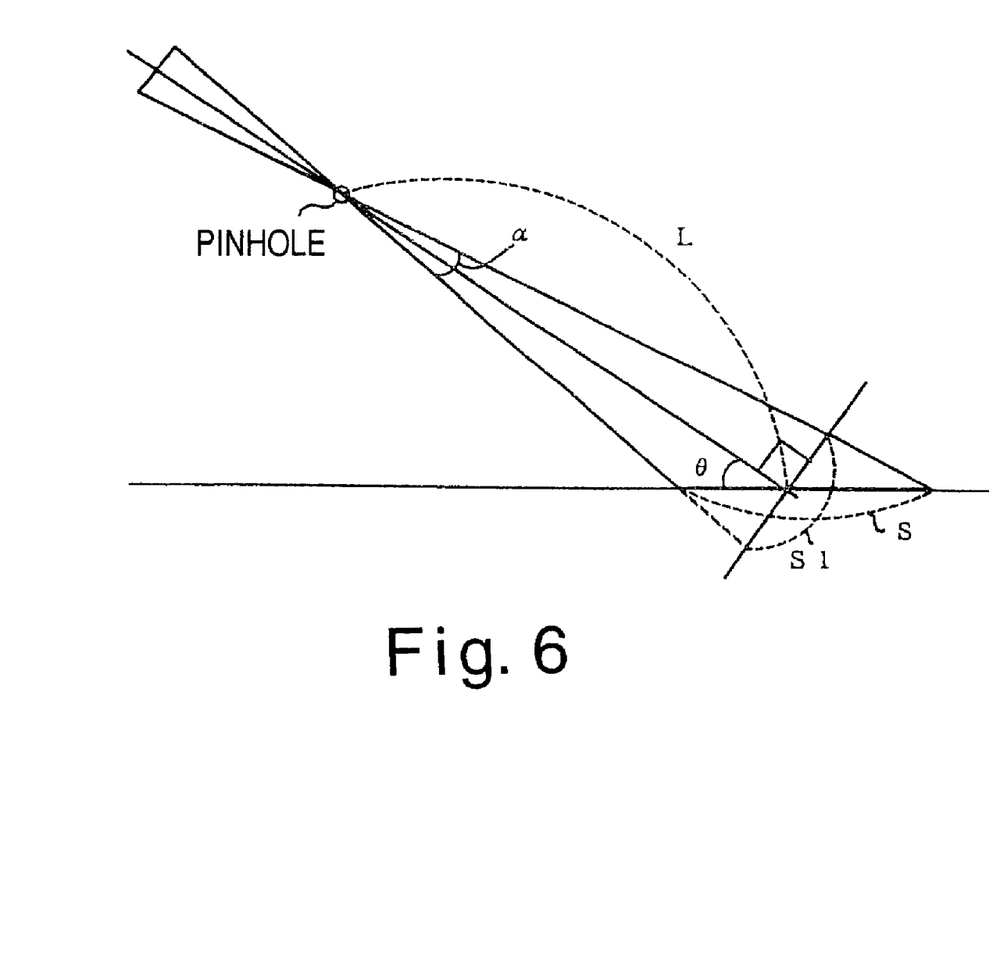
FIG. 6 is a diagrammatic lateral view the pinhole camera to diagrammatically explain the calculations of color and brightness values for producing a synthesizing image by using the synthesizing device and/or method of the present invention, in a case where θ<90 degrees.
Figure 7:
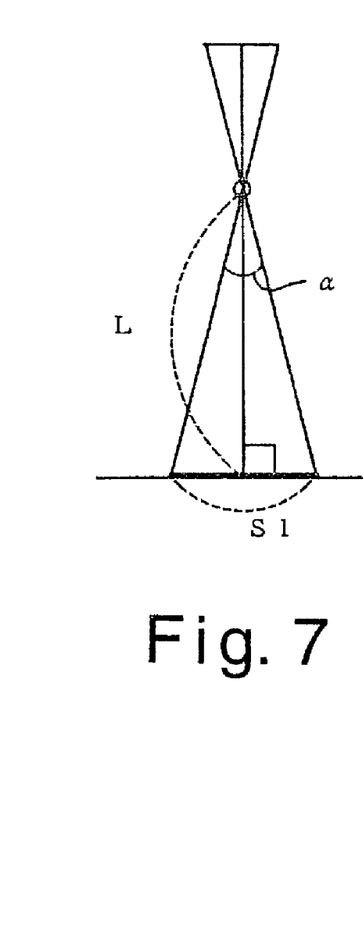
FIG. 7 is a diagrammatic lateral view of the pinhole camera to diagrammatically explain the calculations of color and brightness values for producing a synthesizing image by using the synthesizing device and/or method of the present invention, in a case where θ=90 degrees.

Now, the aforementioned Equations 1 to 3 are explained using FIGS. 5–7, which diagrammatically illustrates a pinhole camera. Thus, the pinhole camera of FIGS. 5–7 illustrates the cameras 101–103. FIG. 5 is a diagrammatic perspective view of the pinhole camera. FIG. 6 is a diagrammatic lateral view of the pinhole camera in which θ less than ninety degrees. FIG. 7 is a diagrammatic lateral view of the pinhole camera in which θ is equal to ninety degrees.

The relative positioning of the pixel V on the CCD pixel surface 110 of the camera 101, 102, or 103, the pinhole 111, and the photographing region V' (the region photographed by the pixel V through the pinhole) are as shown in FIG. 5. Here, the reference surface R is the x-y plane.

The surface area S of the photographing region V' (shaded portion) varies in response to the distance L (see L in FIGS. 6 and 7) between the pinhole 111 and the point C, which corresponds to the center point of the pixel V on the x-y plane, and in response to the angle θ between the x-y plane and a straight line joining the center of the pixel V and the point C. The positional relationship between the CCD pixel surface 110 and the pinhole 111 is fixed.

The relationship between the angle θ and the surface area S is expressed by the equation:

$$S=S1 \,(1/\sin\theta) \quad \text{(Equation 4)},$$

where S1 is a reference surface area for the case in which θ=90 degrees as shown in FIG. 7. Here, θ>>α as shown in FIGS. 6 and 7. The surface area S is also proportional to the square of the distance L as expressed by the equation:

$$S=kL^2 \quad \text{(Equation 5)},$$

where k is a constant.

As previously described, it is believed that the precision of the color and brightness is higher when the surface area V' photographed by the unit pixel V is smaller. Therefore, the function expressed by Equation 1 is equal to the reciprocal of Equation 5, i.e., $f(Ln)=1/Ln^2$. The function expressed by Equation 2 is equal to the reciprocal of Equation 4, i.e., $f(\alpha n)=\sin \alpha n$. The function expressed by Equation 3 is equal to the reciprocal of the combination of Equations 4 and 5, i.e., $f(Ln, \alpha n)=\sin \alpha n/Ln^2$.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2001-304830. The entire disclosure of Japanese Patent Application No. 2001-304830 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An image synthesizing device comprising:
   a plurality of cameras configured to obtain images; and
   an image processing device configured to receive the images from the cameras,
   the image processing device being further configured to synthesize the images of the cameras by
      determining a plurality of observation points for a reference surface being photographed by the cameras,
      synthesizing color and brightness values with respect to the observation points on the reference surface being photographed by each of the cameras by using strengths Sn calculated as a function $f(Ln)$ that is proportional to inverse numbers of square values of distances Ln between the observation points and the cameras to calculate synthesized color and brightness values for the observation points,
      designating the synthesized color and brightness values as the color and brightness values of the observation points.

2. The image synthesizing device as recited in claim 1, wherein the image processing device is further configured to
   synthesize the images of the cameras as a synthesized image of a virtual camera with a predetermined number of pixels through computer processing,
   establish correspondence between each of the observation points and each of the pixels of the virtual camera based on relative position and camera characteristic of the virtual camera, and
   designate the synthesized color and brightness values of the observation points as color and brightness values of the pixels of the virtual camera.

3. An image synthesizing method comprising:
   obtaining images photographed by a plurality of cameras;
   determining a plurality of observation points for a reference surface being photographed by the cameras;
   synthesizing color and brightness values with respect to the observation points on the reference surface being photographed by each of the cameras by using strengths Sn calculated as a function $f(Ln)$ that is proportional to inverse numbers of square values of distances Ln between the observation points and the cameras to calculate synthesized color and brightness values for the observation points; and
   designating the synthesized color and brightness values as the color and brightness values of the observation points.

4. The image synthesizing method as recited in claim 3, further comprising
   synthesizing the images of the cameras as a synthesized image of a virtual camera with a predetermined number of pixels through computer processing,
   establishing correspondence between each of the observation points and each of the pixels of the virtual camera based on relative position and camera characteristic of the virtual camera; and
   designating the synthesized color and brightness values of the observation points as color and brightness values of the pixels of the virtual camera.

5. An image synthesizing device comprising:
   at least first and second means for capturing and generating at least first and second images, respectively; and
   means for processing the at least first and second images from the at least first and second means,
   the means for processing being further configured to synthesize the at least first and second images by
      determining a plurality of observation points for a reference surface being captured by the at least first and second means,
      synthesizing color and brightness values with respect to the observation points on the reference surface being captured and generated by each of the first and second means by using strengths Sn calculated as a function $f(Ln)$ that is proportional to inverse numbers of square values of distances Ln between the observation points and the cameras to calculate synthesized color and brightness values for the observation points, and
      designating the synthesized color and brightness values as the color and brightness values for the observation points.

6. An image synthesizing device comprising:
   a plurality of cameras configured to obtain images; and
   an image processing device configured to receive the images from the cameras, the image processing device further configured to synthesize the images of the cameras by
      determining a plurality of observation points for a reference surface being photographed by the cameras,
      synthesizing color and brightness values with respect to the observation points on the reference surface being photographed by each of the cameras by using strengths Sn calculated as a function $f(\alpha n)$ of angles $\alpha n$ that is proportional to sine values of the angles $\alpha n$ between the reference surface being photographed and straight lines joining the observation points and the cameras to calculate synthesized color and brightness values for the observation points, and
      designating the synthesized color and brightness values as the color and brightness values of the observation points.

7. The image synthesizing device as recited in claim 6, wherein
   the image processing device is further configured to
      synthesize the images of the cameras as a synthesized image of a virtual camera with a predetermined number of pixels through computer processing,
      establish correspondence between each of the observation points and each of the pixels of the virtual camera based on relative position and camera characteristic of the virtual camera, and
      designate the synthesized color and brightness values of the observation points as color and brightness values of the pixels of the virtual camera.

8. An image synthesizing method comprising:

obtaining images photographed by a plurality of cameras;

determining a plurality of observation points for a reference surface being photographed by the cameras;

synthesizing color and brightness values with respect to the observation points on the reference surface being photographed by each of the cameras by using strengths Sn calculated as a function f($\alpha$n) of angles $\alpha$n that is proportional to sine values of the angles $\alpha$n between the reference surface being photographed and straight lines joining the observation points and the cameras to calculate synthesized color and brightness values for the observation points; and designating the synthesized color and brightness values as the color and brightness values of the observation points.

9. The image synthesizing method as recited in claim 8, further comprising synthesizing the images of the cameras as a synthesized image of a virtual camera with a predetermined number of pixels through computer processing, establishing correspondence between each of the observation points and each of the pixels of the virtual camera based on relative position and camera characteristic of the virtual camera; and designating the synthesized color and brightness values of the observation points as color and brightness values of the pixels of the virtual camera.

* * * * *